United States Patent [19]
Williams

[11] Patent Number: 6,135,263
[45] Date of Patent: Oct. 24, 2000

[54] APPARATUS FOR ORGANIZING AND DELIVERING CYLINDRICAL AND ELONGATE ARTICLES FROM A RANDOM DISORDERLY SUPPLY

[76] Inventor: Roger S. Williams, P.O. Box 361, New Richmond, Ohio 45157

[21] Appl. No.: 09/209,500

[22] Filed: Dec. 11, 1998

[51] Int. Cl.[7] .................................................. B65G 47/24
[52] U.S. Cl. ............................................................. 198/396
[58] Field of Search .............................. 198/396; 221/160

[56] References Cited

U.S. PATENT DOCUMENTS

| | | | |
|---|---|---|---|
| 3,250,372 | 5/1966 | Wagner et al. | 198/396 |
| 3,868,012 | 2/1975 | Kinsley | 198/396 |
| 5,641,073 | 6/1997 | Fuchs | 198/396 |
| 5,687,831 | 11/1997 | Carlisle | 198/396 |
| 5,871,080 | 2/1999 | Manzi et al. | 198/396 |

*Primary Examiner*—Joseph E. Valenza

[57] ABSTRACT

An apparatus for organizing elongated meat product from a scrambled accumulation including a conveyor collecting and moving the scrambled meat products to a flighted incline conveyor which in turn lifts the received products to another higher location. A channelizing conveyor receives the products the flighted incline conveyor and arranges them in a substantially parallel and end-to-end relationship. They are thereafter positioned in a canted flighted conveyor having a plurality of product receiving receptacles which continuously moved the collected products to a remote location for subsequent treatment. The canted flighted conveyor has a downward incline to enable surplus products to flow over to the collecting and conveying conveyor once the receptacles are filled.

5 Claims, 6 Drawing Sheets

APPARATUS FOR ORGANIZING AND DELIVERING CYLINDRICAL AND ELONGATE ARTICLES FROM A RANDOM DISORDERLY SUPPLY

BACKGROUND OF THE INVENTION

1. Field of the Invention

This invention relates to a method and means for aligning a plurality of similar, elongate cylindrical articles while transporting or moving the articles from an initial location where they are randomly collected and delivering the articles in precise alignment for subsequent treatment.

2. Description of the Prior Art

Cylindrical elongate meat products like frankfurters and sausages are usually collected randomly from peelers or machines suitable for removing the casing within which the products are formed. This collecting operation is usually done at a fairly high rate of speed so that alignment of the products for subsequent packaging cannot take place at this time. Hence, such randomly collected products must be handled again in order to align them into measured unit quantities for subsequent treatment such as packaging or flavoring.

Unscrambling randomly collected cylindrical elongate products such as frankfurters primarily involves moving the randomly collected products to a sorter that will align the products in an end-to-end relationship so that they can move forward in such a manner to a collection area where further different alignment and grouping can take place. Representative of such an apparatus is that shown in U.S. Pat. No. 3,250,372. In this reference, a device for continuously and automatically advancing similar elongate articles in axial alignment along a directed path of travel and selective removal of the articles therefrom in a predetermined sequence is disclosed. While the system operates efficiently, it is limited in volume because of the singular axial alignment and end-to-end configuration thus limiting the amount of products that can be subsequently collected for packaging.

In view of the desire to handle higher volumes of elongate cylindrical products, it is a primary object of the present invention to provide means for automatically and continuously accumulating a plurality of similar elongate articles in a jumbled, random state of alignment, and then, after forming them into parallel end-to-end lines, imparting a forward motion to the articles to a canted flighted conveyor designed to receive a large volume of elongate products in a parallel alignment that can be subsequently moved to an area for further treatment such as packaging.

Another object of the present invention is to provide simple, yet highly effective, means for efficiently filling the canted flighted conveyor without overloading or misloading to continuously handle large volumes of product.

Yet another object of the present invention is to provide a device of the type described having a canted flighted conveyor that will hold essentially a complete layer of aligned elongate products thus further enhancing the volume of products handled.

Still a further object of the present invention is to provide simple, yet highly effective means for continuously and automatically aligning the axis of the plurality of similar elongate products in layers and rows as the articles are advanced.

The objects of the invention are attained by the provision of a storage conveyor which moves randomly accumulated elongate products to a flighted inclined conveyor which lifts the products upwardly and onto a channelizing conveyor designed to collect the products into plural rows of end-to-end products having parallel axes. An inclined or canted conveyor collects the plural rows of end-to-end products in a layer of rows and thereafter moves the products to a packaging or other work station. The incline of the canted conveyor controls the flow of aligned products so that a rather complete layer is collected and held with the overflow sliding off the top layer and downwardly into the storage conveyor for recycling with an abundance of individual products being supplied to form the layer of rows, the layer is formed quickly and the speed of the machine is maximized.

Thus, there has been outlined the more important features of the invention in order that the detailed description that follows may be better understood and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the arrangement of the components set forth in the following description or illustrated in the drawings. The invention is capable of other embodiments and of being practiced and carried out in various ways.

It is also to be understood that the phraseology and terminology employed herein are for the purpose of description and should not be regarded as limiting in any respect. Those skilled in the art will appreciated that the concept upon which this disclosure is based may readily be utilized as a basis for designing other structures, methods and systems for carrying out the several purposes of this device.

It is important that the claims be regarded as including such equivalent methods and products resulting therefrom that do not depart from the spirit and scope of the present invention and to define the invention of the application, which is measured by its claims, nor to limit its scope in any way.

The objects of the invention set forth above, along with the various features of novelty which characterize the invention, are noted with particularity in the claims and next to and forming a part of this disclosure. For a better understanding of the invention, its operating advantages and the specific results obtained by its use, reference should be may to the following detail specification taken in conjunction with the accompanying drawings wherein like characters of reference designate like parts throughout the several views.

DETAILED DESCRIPTION OF THE PREFERRED EMBODIMENT

Figure 1:
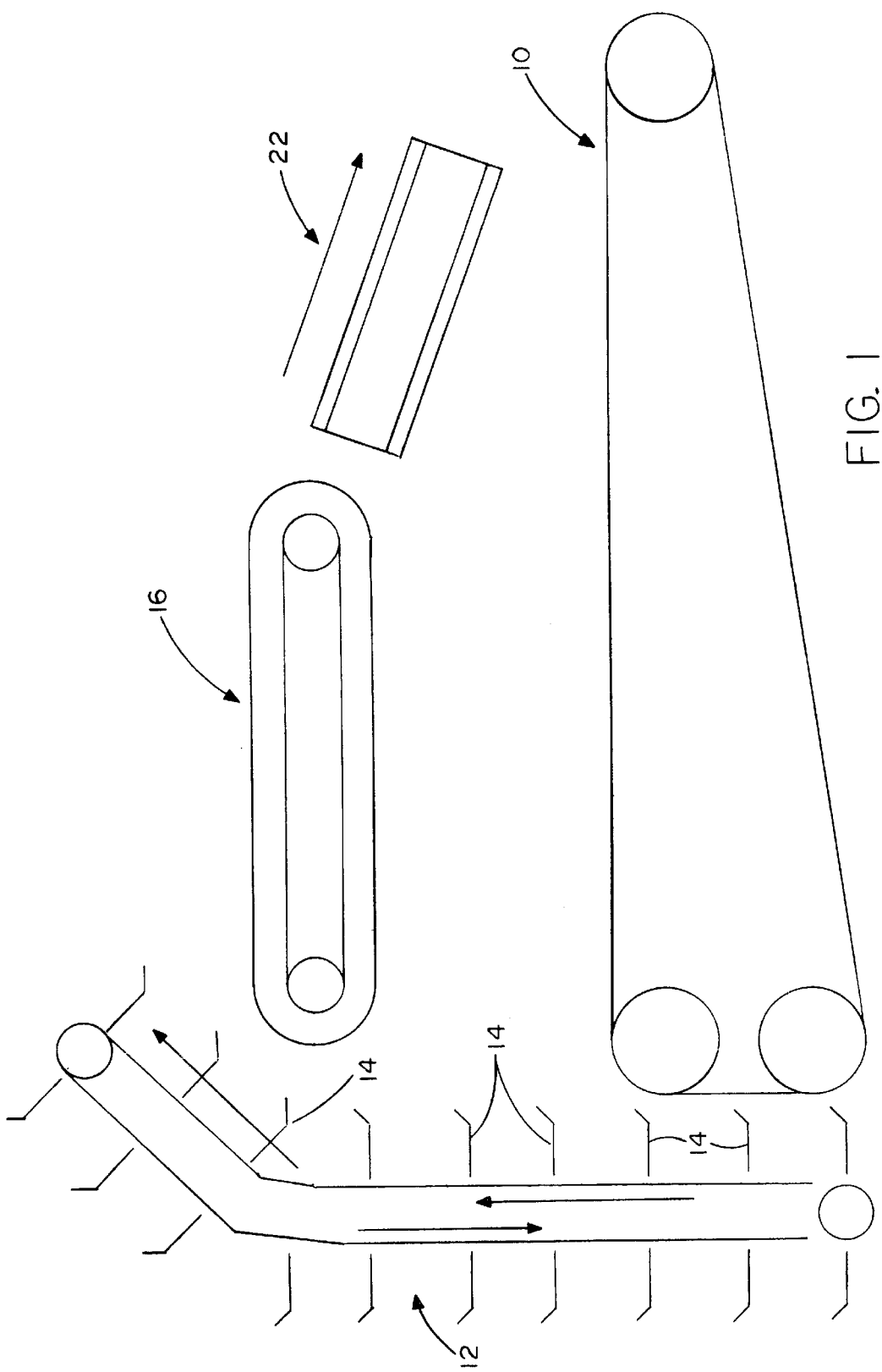
FIG. 1 is a side elevational schematic view of the components of the apparatus comprising the present invention arranged in an operating relationship.
Figure 2:
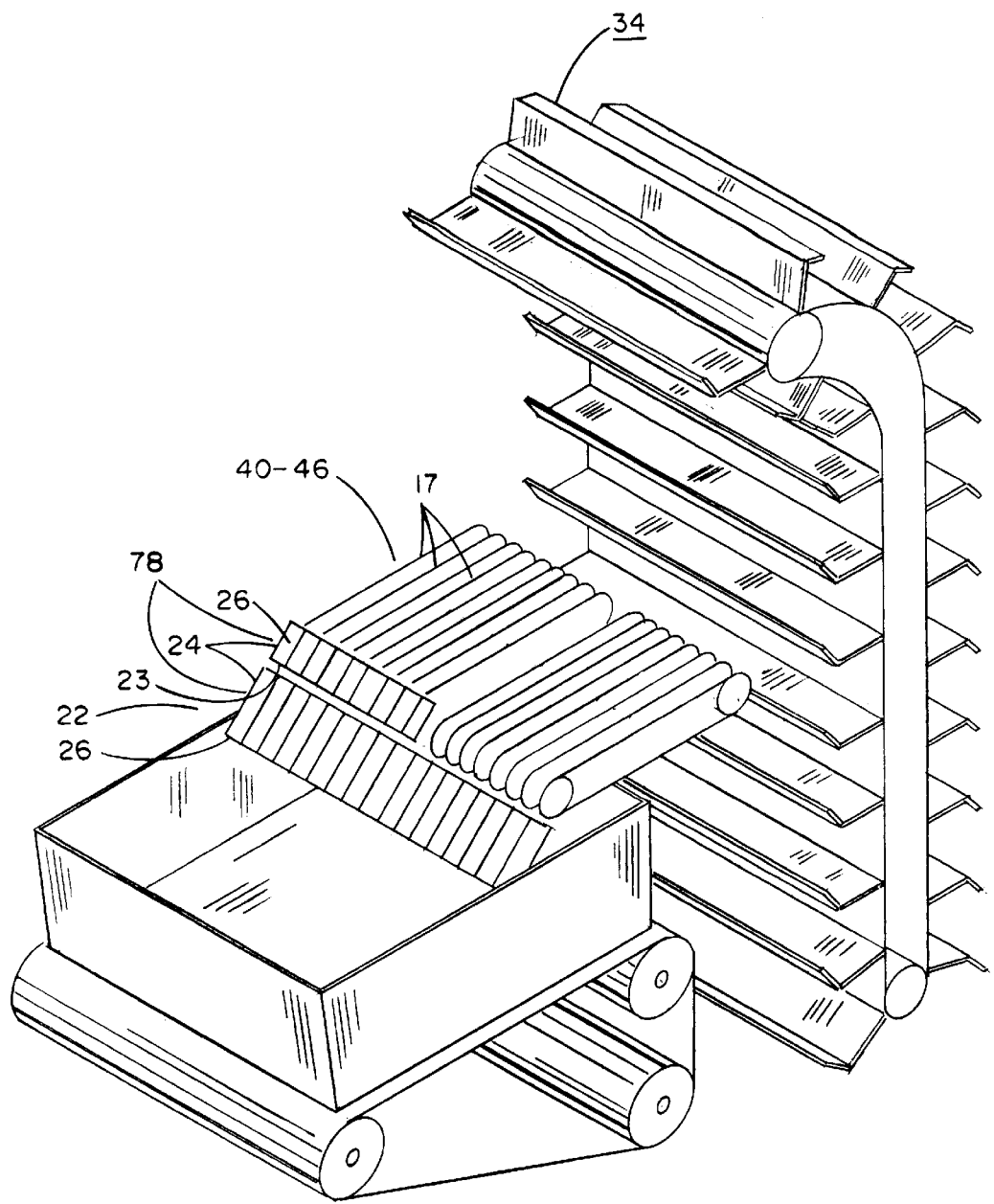
FIG. 2 is a perspective view of the apparatus comprising the present invention.
Figure 3:
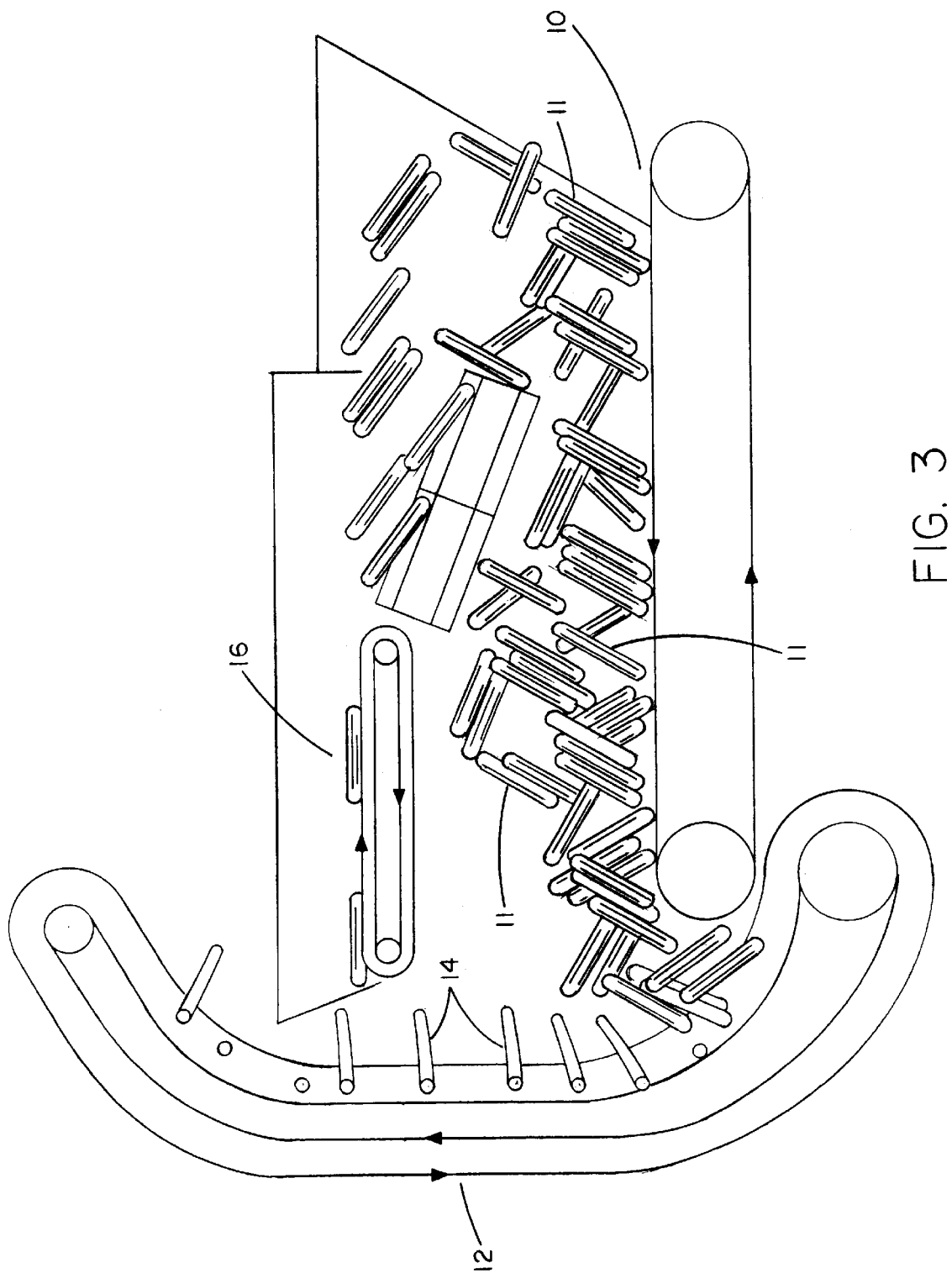
FIG. 3 is a side elevational schematic view of the apparatus of the present invention handling a plurality of scrambled elongate cylindrical meat products.
Figure 4:
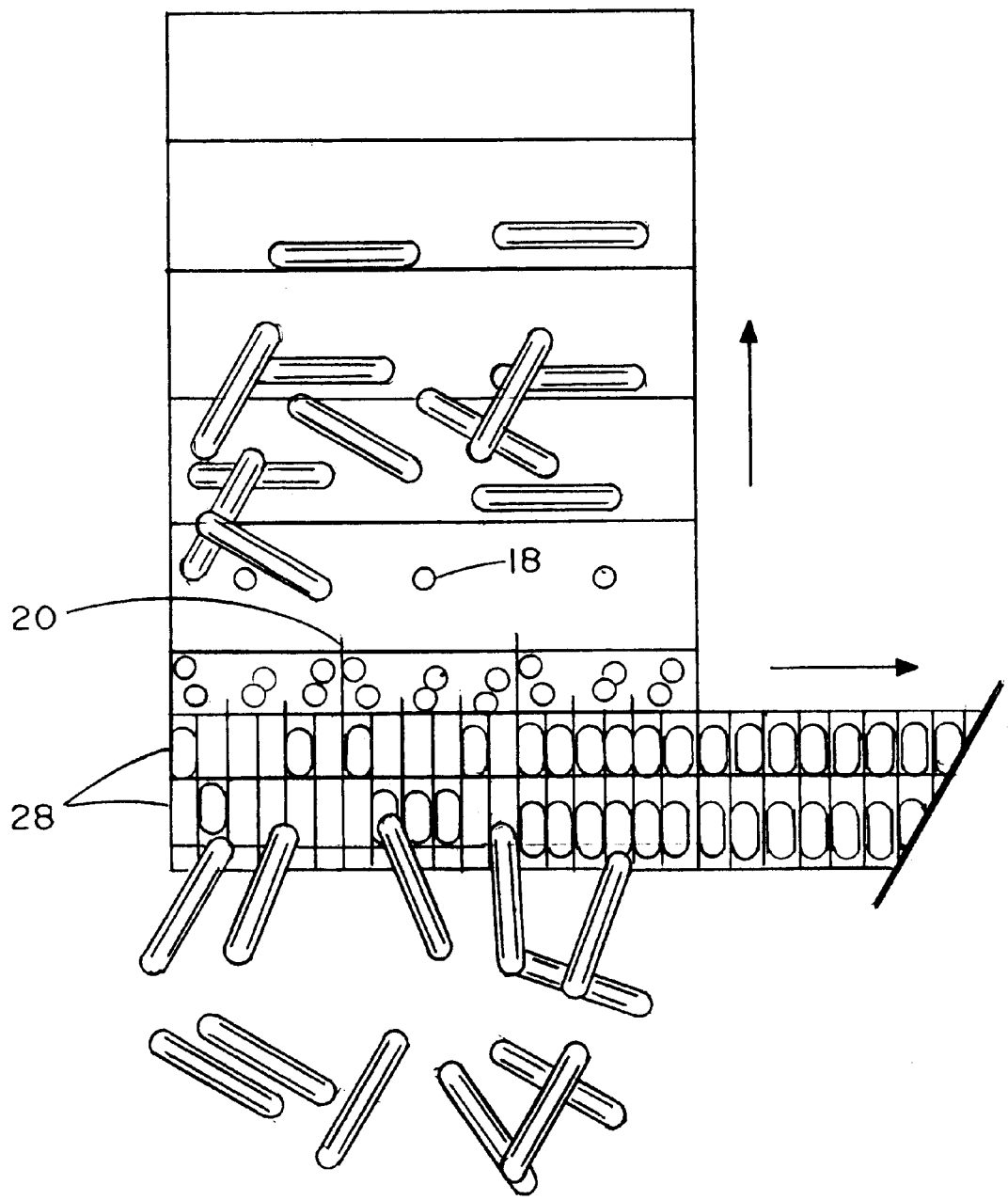
FIG. 4 is a front elevational view of the flighted incline conveyor, the channelizing conveyor and the canted flighted conveyor handling a plurality of elongate meat products.
Figure 5:
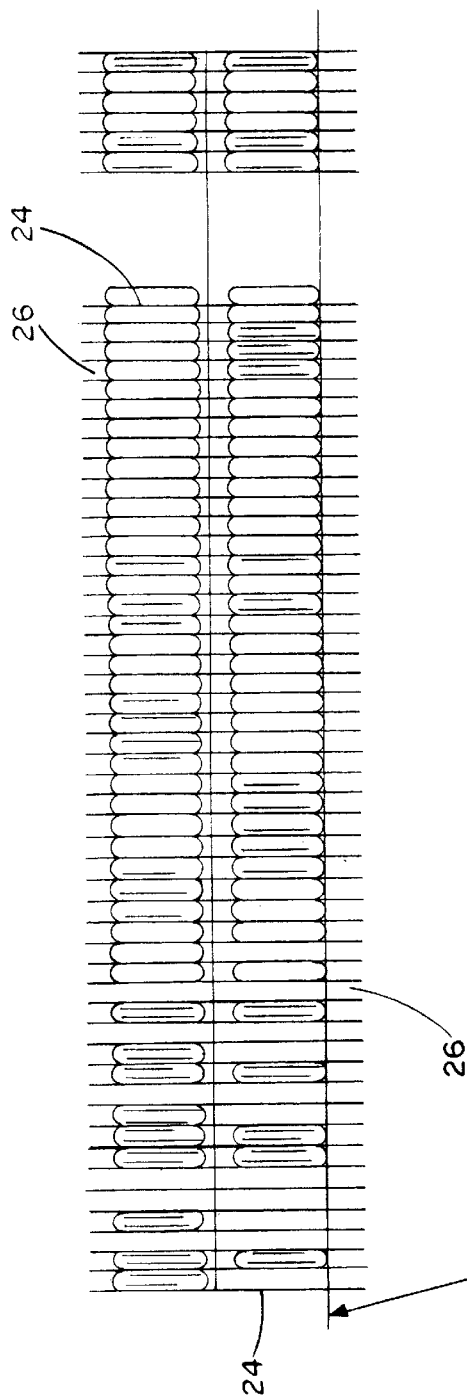
FIG. 5 is a plan schematic view of the canted flighted conveyor holding a plurality of aligned elongate meat products.

Referring now to the drawings and particularly to FIG. 3, a storage container/conveyor shown generally as 10 is supplied with a randomly arranged quantity of elongate meat products 11 from peelers or other appropriate machinery (not shown) and moved in a horizontal direction (see arrow) toward a flighted incline conveyor shown generally as 12 having a plurality of moving shelves 14 receiving quantities of elongate products 11 and moving them upwardly (see arrow) in the direction of a channelizing conveyor shown generally as 16. Channelizing conveyor 16 is best shown in FIG. 2 taking the form of narrow V or U-shaped moving channels 17 sufficiently wide to receive in the longitudinal direction end-to-end positioned elongate meat products 11 and moving them in a direction away from flighted incline conveyor 12 (see arrow). Elongate products 11 are captured as they are displaced from shelves 14 of flighted incline conveyor 12 so that they freely fall downwardly against guide rods 18 and stationary metal dividers 20 as best shown in FIG. 4. The placement of rods 18 and dividers acts upon products 11 to cause them to fall into the substantially parallel relationship described.

From moving channels 17, elongate meat products 11 are moved to a canted flighted conveyor shown generally as 22 which is made up of a layer 23 of two rows 24 of individual compartments 26. Elongate products 11 flow from channels 17 of channelizing conveyor 16 into a layer 23 of 2 rows 26 of canted flighted conveyor 22 until individual compartments 26 of each row 24 are filled. Because canted flighted conveyor 22 is inclined, additional elongated products 11 which move onto products 11 already carried by compartments 26 will continue to move over such compartmentalized products 11 and off conveyor 22 returning to storage/conveyor 10 for recycling. The abundance of products 11 moving to compartments 26 of rows 24 ensure a full product supply in conveyor 22.

Figure 6:
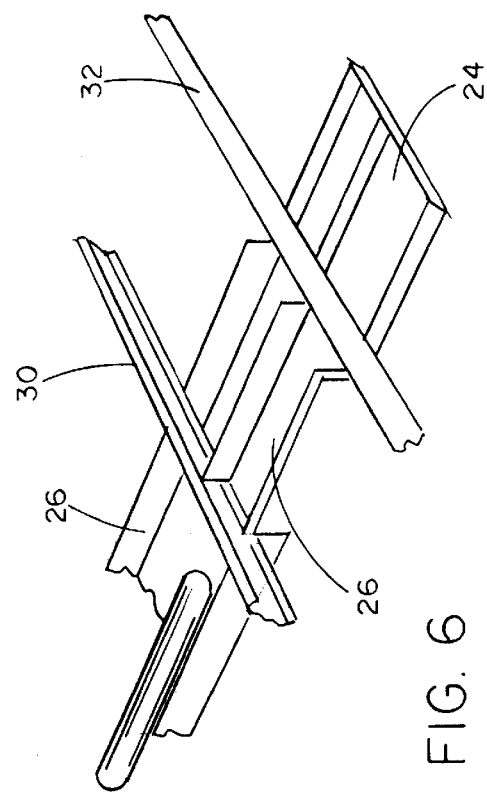
FIG. 6 is a fragmentary enlarged perspective view of one part of the two rows of the layer for products of the canted flighted conveyor holding an elongate meat product.
Figure 7:
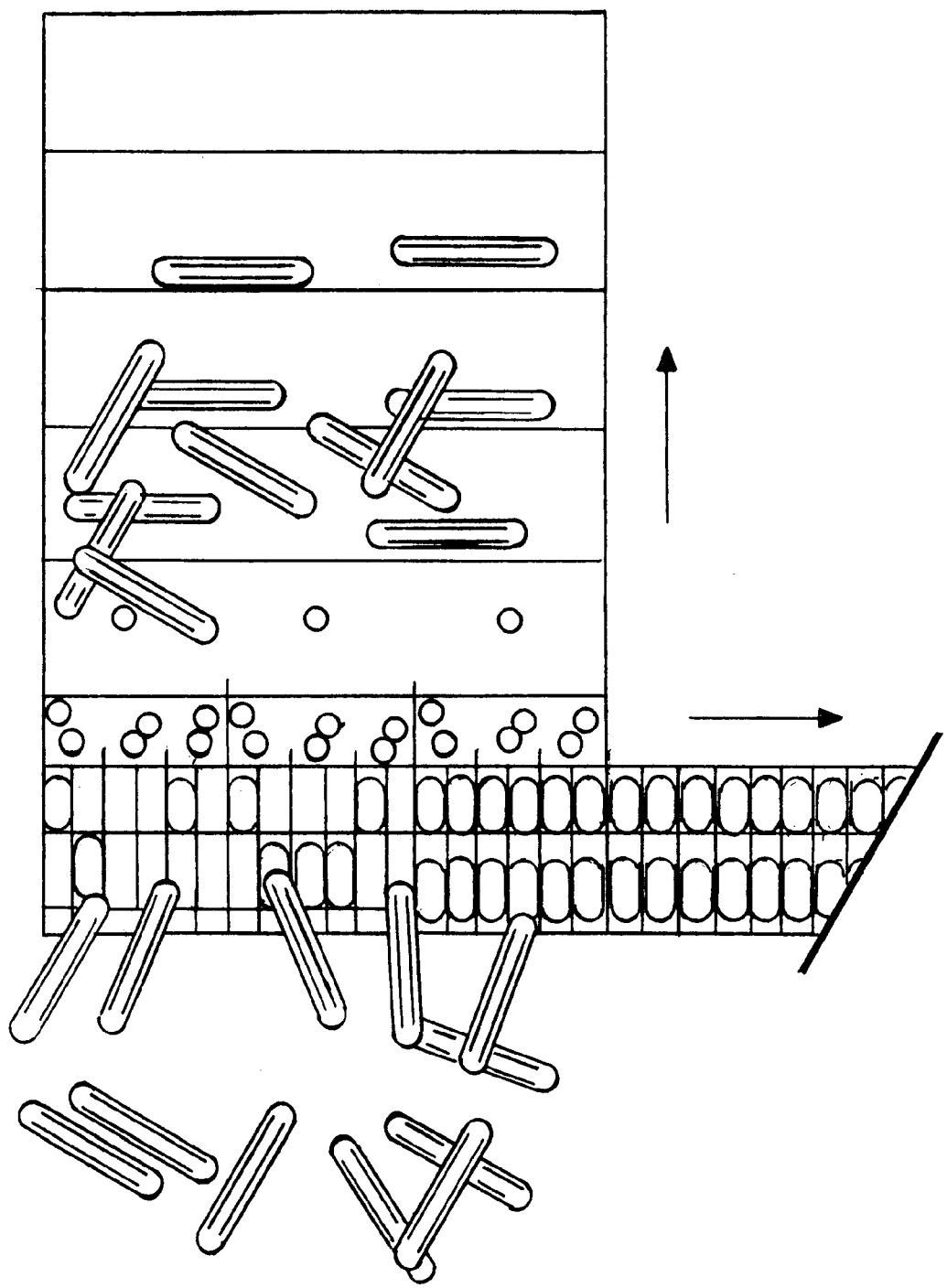
FIG. 7 is a front elevational schematic view of a section of the canted flighted conveyor reclining a plurality of elongate meat products as the rows of the layer are filled and the excess product is recycled.

Each compartment 26 of each row 24 has a stop 30, 32 (FIG. 6) that holds elongate products 11 to form appropriate rows 24. Canted flighted conveyor 22 continuously moves rows 24 of side to side aligned elongate products 11 to a remote location for subsequent treatment such as packaging. Products 11 being in a side by side relationship and having end location consistency can be easily handled in groups convenient for desired package sizes.

The precise location and height of stops 30, 32 can be adjusted as needed to control the precise containment of products 11 depending upon the angle of incline of canted flight conveyor 22 and its relationship with channelizing conveyor 16 and its contained and its moving channels 17. Other appropriate adjustments known to those skilled in the art can be made to maximize product flow and positioning.

The present invention has been shown and described herein in what is considered a most practical and preferred embodiment. It is recognized, however, that departure may be made therefrom within the scope of the invention. The invention is therefore not to be limited to the details disclosed herein but is to be accorded a full scope of the claims so as to embrace any and all equivalent apparatus and methods.

What is claimed is:

1. Apparatus for organizing similar elongate meat products from a random and scrambled accumulation thereof comprising; a storage conveyor including storage means and conveyor means collecting and conveying elongate meat products to a distant location; a flighted incline conveyor continuously receiving elongate products from the storage conveyor and moving them upwardly to a remote location; a channelizing conveyor receiving elongate products from the flighted incline conveyor and aligning the elongate products in a substantially parallel and end-to-end relationship; a canted flighted conveyor having a plurality of elongate product receiving receptacles receiving elongate products from the channelizing conveyor continuously and moving the received and aligned elongate products to a remote location for subsequent treatment, the canted flighted conveyor having a downward incline with respect to the channelizing conveyor so that elongate products will move off of the canted flighted conveyor back to the storage conveyor when the receptacles are filled with elongate products.

2. The apparatus as claimed in claim 1 wherein the canted flighted conveyor having two rows of receiving receptacles receiving elongate forming a flight of receiving receptacles.

3. The apparatus as claimed in claim 1 wherein the one or more channelizing conveyors move a continuous supply of elongate products simultaneously into the elongate article receiving receptacles of the canted flighted conveyor.

4. The apparatus as claimed in claim 1 wherein the flighted incline conveyor has a plurality of steps for continuously receiving elongate products from the storage conveyor and moving them upwardly to a remote location.

5. A method of organizing similar elongate meat products from a random and unscrambled accumulation and conveying them to a remote location for subsequent treatment comprising the steps of: continuously moving a plurality of scrambled elongate meat products to a flighted incline conveyor; moving the flighted incline conveyor to transport the elongate products upwardly to another location; depositing the moving elongate products on a channelizing conveyor to align the products in a substantially parallel and end-to-end relationship; and conveying the aligned elongate products to a canted flighted conveyor having elongate product receiving receptacles which continuously move the collected products to a remote location for subsequent treatment wherein the products moving on the channelizing conveyor will move over previously deposited products in the canted flighted conveyor receptacles and back to the storage conveyor when the receptacles are filled with elongate products.

* * * * *